Sept. 8, 1931.  A. H. SHOEMAKER  1,822,320
PNEUMATIC TIRE AND RIM
Filed March 22, 1928

INVENTOR
Alvin H. Shoemaker
BY
Fred C. Matheny
ATTORNEY

Patented Sept. 8, 1931

1,822,320

UNITED STATES PATENT OFFICE

ALVIN H. SHOEMAKER, OF SEATTLE, WASHINGTON

PNEUMATIC TIRE AND RIM

Application filed March 22, 1928. Serial No. 263,661.

My invention relates to improvements in pneumatic tire and rim construction and the object of my invention is to provide a pneumatic tire which is combined with a rim in such a manner as to retain air under pressure without the use of an inner tube.

Another object is to provide a tire and rim construction of this nature in which the bead portion of the tire is forced outwardly by air pressure onto an inclined bead receiving rim portion, said bead receiving rim portion having a shoulder of shallow depth formed thereon which acts as an automatic positioning means to properly position the tire on the rim.

A further object is to provide a tire and rim construction of this nature in which the bead portions of the tire are provided at their innermost edges with inwardly extending air seal flanges of elastic material that are adapted to press against the edges of the rim and prevent the escape of air when the tire is inflated and to further provide a rim having shoulders on the bead receiving portions of the same which shoulders automatically position the tire so as to insure the proper seating and sealing contact of the seal flanges.

Other and more specific objects will be apparent from the following description taken in connection with the accompanying drawings.

Figure 1:
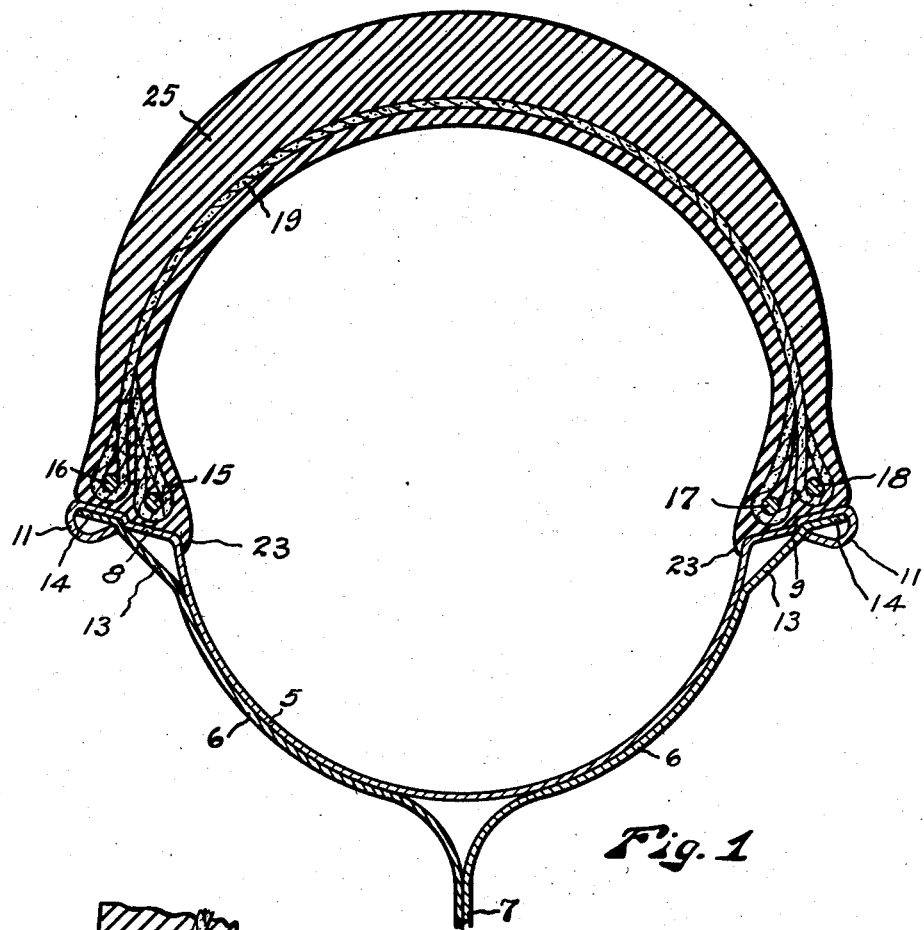

In the drawings Figure 1 is a view in cross section of a pneumatic tire and rim constructed in accordance with my invention showing the tire mounted on the rim.

Figure 2:
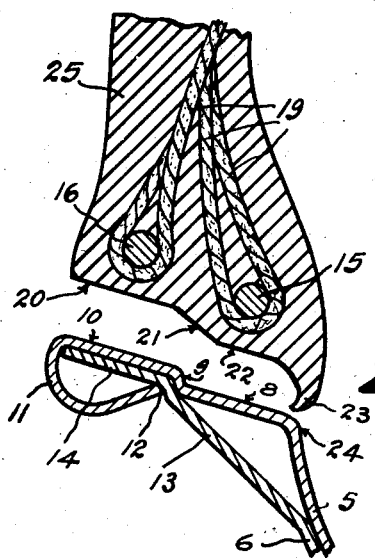

Fig. 2 is a fragmentary view in cross section on an enlarged scale of the bead portion of the tire and the bead receiving portion of the rim showing the tire and rim separated a short distance from each other.

Referring to the drawings, throughout which like reference numerals designate like parts, 5 designates an annular wheel rim of concave cross sectional shape and of air tight construction. The rim 5 is supported by two flaring portions 6 which diverge from a wheel web 7. At its two side edges the rim 5 is bent outwardly to form two inclined bead receiving flanges each of which comprises an inner inclined portion 8, a shoulder 9 of relatively shallow depth and an outer inclined portion 10. The outer edges of the inclined bead receiving portions 10 are bent downwardly and inwardly as at 11 and the extremities of the same are forced tightly against the flaring portions 6 as at 12 at the location of the shoulders 9, thereby clinching the edges 14 of the flaring portions 6 within the inwardly bent portions 11. From the locations 12 the flaring portions 6 extend angularly inward as at 13 until they engage with the outer side of the rim member 5, thence they follow around and support said rim member. The angular portions 13 brace and support the outer edges of the inclined bead receiving portions of the rim. A valve, not shown, is necessarily provided at a suitable location in the rim 5.

The tire herein disclosed comprises a tire body 25 of rubber or rubber composition provided with inclined bead portions of the same material, within which are embedded, preferably four, non-elastic annular bead rings 15, 16, 17 and 18. Cords 19 extend transversely through the body of the tire and are drawn around the bead rings on both sides. These cords extend in planes substantially crosswise of the tire, there being no longitudinal or diagonal cords in the tire body. The tire is thus left free to stretch longitudinally except for the bead rings.

The bead portion or foot of the tire, see Fig. 2 consists of an outer flat portion 20 arranged to rest on the rim portion 10; a more abruptly inclined or shouldered portion 21 arranged to engage with the rim shoulder 9; an inclined flat portion 22 arranged to rest on the rim portion 8 and an inwardly directed tapered air seal flap or ring 23 arranged to lie just inside the bend 24 of the rim 5 and to prevent the escape of air as hereinafter set forth.

The tire may be mounted on the rim, in an obvious manner, by allowing parts of the bead portions of the tire to enter the concave part of the rim while the diametrically opposite parts of the tire beads are being slipped over the inclined bead receiving portions of the rim. After the tire is on the rim the bead portions of the tire will tend to spread apart and seat on the inclined bead receiving portions of the rim thus forming sufficient temporary air seal to hold the initial pressure of air when the air is first admitted to the tire. As the air pressure within the tire increases the bead portions of the tire will be forced outwardly on the inclined bead receiving portions of the rim causing them to bind more tightly on the rim and thus more effectively prevent the escape of air. By the time the tire is fully inflated the annular inclined shoulders 21 on the bead portions of the tire will have seated firmly against the rim shoulders 9 and the annular air seal flanges 23 of soft elastic material on the tire will have been pressed tightly against the inner sides of the arcuate rim 5, thus forming an efficient air seal which will absolutely prevent the escape of air between the tire and rim for all conditions encountered in the operation of pneumatic tires.

When the tire beads are firmly seated on the inclined rim shoulders the outer non-elastic bead rings 16 and 18 will be forced outwardly very tightly on the rim portions 10 and the inner non-elastic bead rings 15 and 17 will be forced onto the portion 8 and against the shoulder 9, said rings being small enough so that they can not be forced over the shoulders 9.

The shoulders 9 thus serve to limit the outward movement of the tire beads on the rims around the full three hundred sixty degrees of the wheel thus insuring that the air seal flange 23 will always seat properly against the curved portions 24 of the rim 5. The shoulders 9 thus serve as a positioning means for insuring the accurate seating of the air seal flange 23. When this shoulder 9 is provided it becomes substantially impossible for any one to put the tire on in an improper manner but when this shoulder is not used it is necessary to watch the tire closely during the process of inflation and in some instances to use external means to cause the tire bead portions to take the correct positions on the rim.

The foregoing description and accompanying drawings clearly disclose a preferred embodiment of my invention but it will be understood that this disclosure is merely illustrative and that such changes may be made as are fairly within the scope and spirit of the following claims.

I claim:

1. A pneumatic tire and rim construction embodying an air tight rim having at each edge an annular inclined bead receiving portion comprising an inner cone segment of smaller diameter and an outer cone segment of larger diameter, which cone segments are connected with each other by an annular shoulder of relatively shallow depth, a tire having non-expansible bead portions of elastic material arranged to seat on said cone segments of said inclined bead receiving portions and to be positioned thereon by engagement with said shoulder, and an annular inwardly directed air seal flange formed on the inner edge of each of said tire beads.

2. A pneumatic tire and rim construction capable of retaining air under pressure without the use of an inner tube, embodying a peripherally recessed air tight rim, inclined bead receiving portions at the sides of said rim, an annular shoulder of shallow depth formed in each of said bead receiving portions substantially mid-way between the two edges thereof, a tire having inclined bead portions of elastic material arranged to seat firmly on the inclined bead receiving portions of said rim on both sides of said shallow shoulders, shoulder means on said tire beads arranged to engage said shallow shoulders on said bead receiving portions to position said tire on said rim, non-elastic bead rings in said tire bead portions on each side of said shoulders and an annular air seal flange of elastic material extending inwardly from the inner edge of each of said tire beads and arranged to be pressed against the rim by internal air pressure.

3. A pneumatic tire and rim construction embodying a peripherally recessed air tight rim having at each edge an annular inclined bead receiving portion formed of two cone segments joined by an annular shoulder of relatively shallow depth, a tire having non-expansible bead portions of elastic material each provided with two conical inclined footings arranged to seat on said inclined cone segments of said bead receiving portions, said footings of each bead portion each being connected by an inclined portion of greater pitch than the footing arranged to engage with said shoulder and to be positioned thereby on said bead receiving rim portions and an annular inwardly directed air seal flange formed on the inner edge of each of said tire beads and arranged to project inside of the recessed portion of said rim.

4. A pneumatic tire embodying a tire body terminating at its two inner edges in two bead portions, said bead portions each having a footing formed of an inner cone section of smaller diameter and an outer cone section of larger diameter connected by a more abruptly inclined shoulder portion, an inwardly directed air seal flange at the inner edge of said bead portions and non-elastic annular bead rings in said bead portions.

5. In apparatus of the class described, a wheel rim, an outwardly directed inclined bead receiving portion on each edge of said rim, each of said bead receiving portions embodying an inner cone segment of smaller diameter and an outer cone segment of larger diameter, and a relatively abrupt shoulder of shallow depth connecting said two cone segments.

6. A pneumatic tire embodying a tire body terminating at its two inner edges in two bead portions, said bead portions each having a footing formed of an inner cone section of smaller diameter and an outer cone section of larger diameter connected by a more abruptly inclined shoulder portion and non-elastic annular bead rings in said bead portions.

The foregoing specification signed at Seattle, Wash., this 2d day of February, 1928.

ALVIN H. SHOEMAKER.